US012692015B1

(12) United States Patent
Torres Gámiz et al.

(10) Patent No.: US 12,692,015 B1
(45) Date of Patent: Jul. 28, 2026

(54) VISUAL PERCEPTION AUGMENTATION SYSTEM

(71) Applicant: The Boeing Company, Arlington, VA (US)

(72) Inventors: Alejandro Torres Gámiz, Madrid (ES); Barend-Jan Van Bruchem, Madrid (ES); Maxim Constantijn Vos, Móstoles (ES)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 19/036,815

(22) Filed: Jan. 24, 2025

(51) Int. Cl.
| | |
|---|---|
| *B64D 45/00* | (2006.01) |
| *G06F 3/01* | (2006.01) |
| *G06F 3/14* | (2006.01) |
| *G06T 7/70* | (2017.01) |
| *G09G 3/00* | (2006.01) |

(52) U.S. Cl.
CPC ............. *B64D 45/00* (2013.01); *G06F 3/013* (2013.01); *G06F 3/1423* (2013.01); *G06T 7/70* (2017.01); *G09G 3/001* (2013.01); *G06T 2207/30261* (2013.01); *G09G 2340/0407* (2013.01); *G09G 2340/0464* (2013.01); *G09G 2354/00* (2013.01); *G09G 2380/12* (2013.01)

(58) Field of Classification Search
CPC .......... B64D 45/00; G06T 7/70; G06F 3/013; G06F 3/1423; G09G 3/001; G09G 2340/0407; G09G 2340/0464; G09G 2354/00; G09G 2380/12
USPC ........................................................ 345/156
See application file for complete search history.

(56) References Cited

U.S. PATENT DOCUMENTS

| | | |
|---|---|---|
| 7,961,117 B1 | 6/2011 | Zimmerman et al. |
| 9,457,914 B1 | 10/2016 | Cline et al. |
| 11,046,452 B1 * | 6/2021 | Viswanatha ........... G02B 27/01 |
| 2010/0060510 A1 * | 3/2010 | Nouvel ................... G01C 5/005 |
| | | 340/963 |
| 2017/0255257 A1 * | 9/2017 | Tiana ...................... G06F 3/012 |
| 2020/0183154 A1 | 6/2020 | Bailly |

FOREIGN PATENT DOCUMENTS

| | | |
|---|---|---|
| EP | 3454175 A1 | 3/2019 |
| EP | 4130939 A1 | 2/2023 |

OTHER PUBLICATIONS

Extended European Search Report for European Application No. EP25210651.3 dated Mar. 31, 2026, 8 pages.

* cited by examiner

*Primary Examiner* — Mark Edwards
(74) *Attorney, Agent, or Firm* — Harrity & Harrity, LLP

(57) ABSTRACT

In some implementations, a system within a flight deck of an aircraft determines, based on line-of-sight data associated with an aircraft operator stationed within the flight deck of the aircraft, a field of view (FOV) of the aircraft operator. The system determines display configuration information based on a set of one or more visual references derived from the FOV of the aircraft operator. The system updates a projection display component that is positioned within the flight deck and within the FOV of the aircraft operator to display at least visual representation information associated with the set of one or more visual references based on the display configuration information.

20 Claims, 13 Drawing Sheets

500

| 510 | Determine, based on first line-of-sight data, the field of view (FOV) of the first aircraft operator |

| 520 | Determine, based on second line-of-sight data, the FOV of the second aircraft operator |

| 530 | Determine first display configuration information based on a first set of one or more visual references derived from the FOV of the first aircraft operator |

| 540 | Determine second display configuration information based on a second set of one or more visual references derived from the FOV of the second aircraft operator |

| 550 | Update the first projection display component to display at least first visual representation information associated with the first set of one or more visual references based on the first display configuration information |

| 560 | Update the second projection display component to display at least second visual representation information associated with the second set of one or more visual references based on the second display configuration information |

FIG. 5

VISUAL PERCEPTION AUGMENTATION SYSTEM

FIELD

The present disclosure relates generally to a visual perception augmentation system and to a visual perception augmentation system within a flight deck of an aircraft.

BACKGROUND

A projection display, such as a heads-up display (HUD) or a windscreen, presents information on a transparent surface. Such a display can be included in aircraft to provide flight information to an aircraft operator to reduce a need for the aircraft operator to look at other instruments or displays within the aircraft.

SUMMARY

An embodiment of the present disclosure provides a visual perception augmentation system that comprises a first projection display component configured to be within a field of view (FOV) of a first aircraft operator; a second projection display component configured to be within a FOV of a second aircraft operator; a camera system configured to observe a line of sight of the first aircraft operator and a line of sight of the second aircraft operator; and one or more processors configured to: determine, based on relative position information derived from aircraft data, first display configuration information based on a first set of one or more visual references derived from the FOV of the first aircraft operator; determine, based on the relative position information, second display configuration information based on a second set of one or more visual references derived from the FOV of the second aircraft operator; update the first projection display component to display at least first visual representation information associated with the first set of one or more visual references based on the first display configuration information; and update the second projection display component to display at least second visual representation information associated with the second set of one or more visual references based on the second display configuration information.

Another embodiment of the present disclosure provides a non-transitory computer-readable medium storing a set of instructions comprising one or more instructions that, when executed by one or more processors of a system within a flight deck of an aircraft, cause the system to: determine, based on line-of-sight data associated with an aircraft operator, an FOV of the aircraft operator; determine, based on relative position information, display configuration information based on a set of one or more visual references derived from the FOV of the aircraft operator; and update a projection display component that is positioned within the flight deck and within the FOV of the aircraft operator to display at least visual representation information associated with the set of one or more visual references based on the display configuration information.

Yet a further embodiment of the present disclosure provides a method performed by a system within a flight deck of an aircraft comprises determining, based on line-of-sight data associated with an aircraft operator, an FOV of the aircraft operator; determining display configuration information based on a set of one or more visual references and derived from the FOV of the aircraft operator; and updating a projection display component that is positioned within the flight deck and within the FOV of the aircraft operator to display at least visual representation information associated with the set of one or more visual references based on the display configuration information.

The features, functions, and advantages that have been discussed can be achieved independently in various implementations or may be combined in yet other implementations further details of which can be seen with reference to the following description and drawings.

BRIEF DESCRIPTION OF THE DRAWINGS

FIG. 5 is a flowchart of an example process associated with a visual perception augmentation system.

DETAILED DESCRIPTION

Figure 1A:
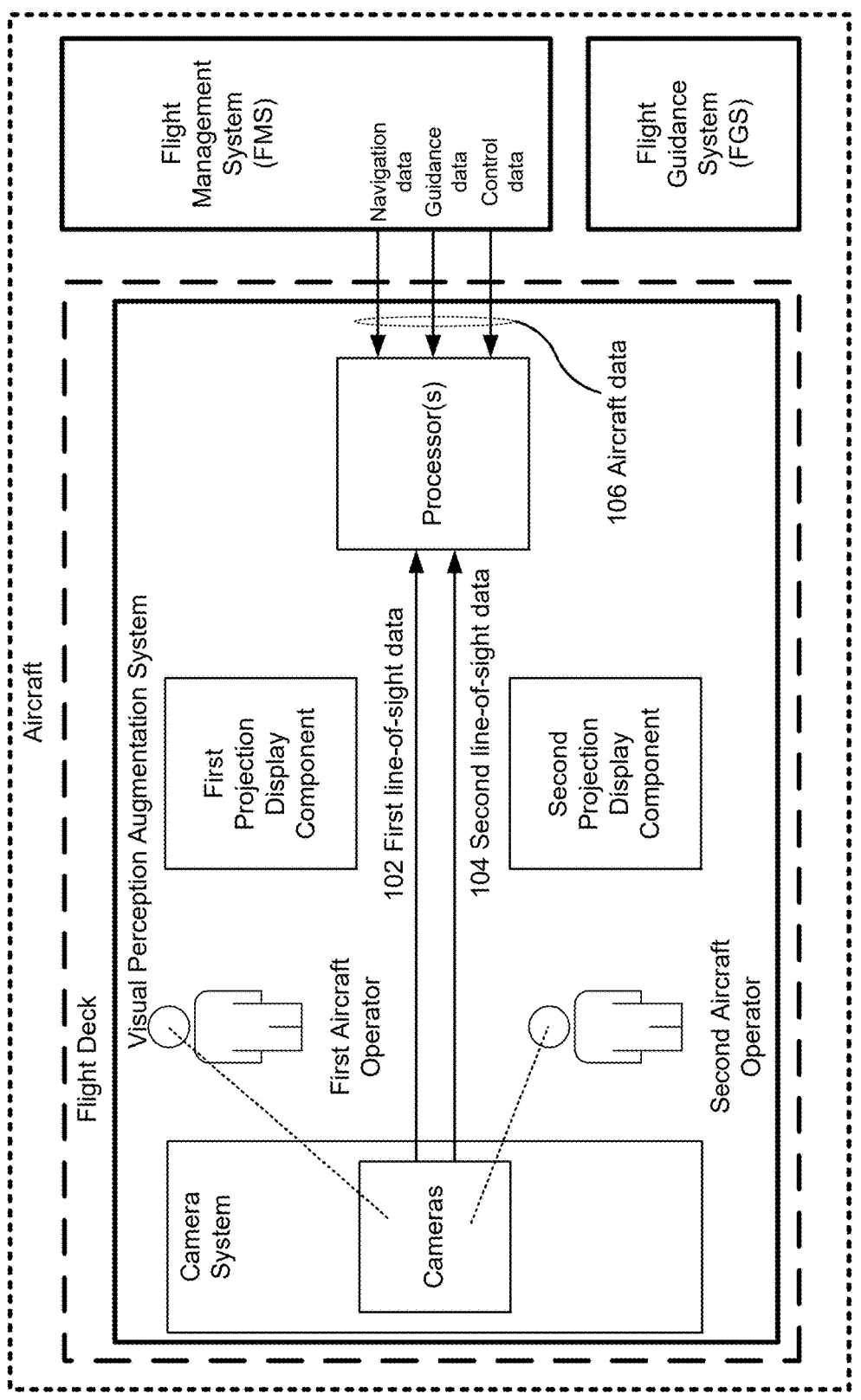
FIGS. 1A-1I are diagrams of an example implementation associated with a visual perception augmentation system.

The following detailed description of example implementations refers to the accompanying drawings. The same reference numbers in different drawings may identify the same or similar elements.

Aircraft operators (e.g., a captain and a first officer) of an aircraft, when stationed within a flight deck of the aircraft to control flight operations of the aircraft, can observe an external environment through one or more windscreens of the aircraft. This enhances a situational awareness of the aircraft operators, which enables informed flight control decisions. To further assist, many aircraft include projection displays positioned in the flight deck, in front of the windscreens, that provide flight information that can be viewed by the aircraft operators while the aircraft operators face the one or more windscreens to view the external environment.

In many cases, projection displays provide information about visual references in the external environment, but the placement of the information does not account for the differing FOVs of the aircraft operators. For example, a visual representation, such as an icon, associated with a visual reference appears in the same relative position on each projection display to indicate the visual reference's proximity to the aircraft. However, the positioning of the visual representation on a specific projection display, as viewed by a particular aircraft operator, often does not align with the particular aircraft operator's actual observed position of the visual reference through the aircraft's one or more windscreens.

This misalignment between the projected visual representation and the actual observed position of the visual reference can lead to confusion or misjudgment by the aircraft operator. When the displayed information does not accurately correspond to the external environment, the aircraft operators may misinterpret a proximity or direction of the visual reference, which can impact situational awareness. This discrepancy can result in inaccurate or unnecessary flight operations with respect to navigation, positioning, alignment, or other types of operations of the aircraft with respect to the visual reference. For example, the aircraft operator causes the aircraft to deviate from a flight path associated with the visual reference, and thereafter, the aircraft makes corrective maneuvers to realign the aircraft with the flight path. This increases a computational load of a flight management system (FMS) and other guidance systems of the aircraft, such as a flight guidance system (FGS) or another guidance system, to calculate and implement the corrective maneuvers, and can increase a fuel consumption of the aircraft to perform the corrective maneuvers.

Some implementations described herein include a visual perception augmentation system. The visual perception augmentation system is positioned within a flight deck of an aircraft. A first aircraft operator and a second aircraft operator can be stationed within the flight deck, such as in respective portions of the flight deck. The visual perception augmentation system includes a first projection display component positioned within the flight deck (e.g., within a first portion of the flight deck) that is configured to be within the FOV of the first aircraft operator (e.g., when the first aircraft operator is stationed within the flight deck, such as at a first operator station), and also includes a second projection display component positioned within the flight deck (e.g., within a second portion of the flight deck) and configured to be within the FOV of the second aircraft operator (e.g., when the second aircraft operator is stationed within the flight deck, such as at second operator station). The visual perception augmentation system includes a camera system that includes a plurality of cameras and that is positioned within the flight deck. The camera system is configured to observe a line of sight of the first aircraft operator (e.g., when the first aircraft operator is stationed within the flight deck), which originates from a point of view (POV) of the first aircraft operator (e.g., a vertex of the FOV of the first aircraft operator), and to observe a line of sight of the second aircraft operator (e.g., when the second aircraft operator is stationed within the flight deck), which originates from a POV of the second aircraft operator (e.g., a vertex of the FOV of the second aircraft operator). The visual perception augmentation system includes one or more processors that are communicatively connected to the first projection display component, the second projection display component, and the camera system.

In some implementations, the visual perception augmentation system (e.g., using the one or more processors) obtains first line-of-sight data captured by the camera system and thereby determines the FOV of the first aircraft operator. The visual perception augmentation system (e.g., using the one or more processors) additionally determines, based on relative position information that indicates an estimated relative position of a visual reference with respect to the aircraft, first display configuration information that is associated with the visual reference and the FOV of the first aircraft operator. The first display configuration information indicates a first display position for the visual reference. Accordingly, the visual perception augmentation system (e.g., using the one or more processors) updates the first projection display component to display at least first visual representation information associated with the visual reference based on the first display configuration information. This causes the first projection display component to display visual representation elements associated with the visual reference, as indicated by the first visual representation information, to be positioned in the first display position as indicated by the first display configuration information.

Further, in some implementations, the visual perception augmentation system (e.g., using the one or more processors) obtains second line-of-sight data captured by the camera system and thereby determines the FOV of the second aircraft operator. The visual perception augmentation system (e.g., using the one or more processors) additionally determines, based on the relative position information, second display configuration information that is associated with the visual reference and the FOV of the second aircraft operator. The second display configuration information indicates a second display position for the visual reference. Accordingly, the visual perception augmentation system (e.g., using the one or more processors) updates the second projection display component to display at least second visual representation information associated with the visual reference based on the second display configuration information. This causes the second projection display component to display visual representation elements associated with the visual reference, as indicated by the second visual representation information, to be positioned in the second display position as indicated by the second display configuration information.

In this way, visual representation elements associated with the visual reference are displayed on the first projection display component such as to appear, to the first aircraft operator, to be aligned with the first aircraft operator's actual observed position of the visual reference through one or more windscreens of the aircraft. Further, visual representation elements associated with the visual reference are displayed on the second projection display component such as to appear, to the second aircraft operator, to be aligned with the second operator's actual observed position of the visual reference through the one or more windscreens of the aircraft. This alignment between the displayed visual representation elements and the respective observed positions of the visual references reduces a likelihood of confusion or misjudgment by the aircraft operators. The aircraft operators are therefore more likely to accurately assess a proximity or direction of the visual reference, which improves the situational awareness of the aircraft operators.

Thus, the visual perception augmentation system can reduce a number of inaccurate or unnecessary flight operations with respect to navigation, positioning, alignment, or other types of operations of the aircraft with respect to the visual reference. For example, because of improved situational awareness, the aircraft operators are less likely to cause the aircraft to deviate from a flight path associated with the visual reference. Therefore, corrective maneuvers to realign the aircraft with the flight path are less likely to be needed. A computational load of an FMS of the aircraft, as well as other guidance systems of the aircraft, such as an FGS or another guidance system, to calculate and implement any corrective maneuvers is thus reduced, and a fuel efficiency of the aircraft is improved by the aircraft not performing, or performing fewer, corrective maneuvers.

FIGS. 1A-1I are diagrams of an example implementation 100 associated with a visual perception augmentation system. As shown in FIGS. 1A-1I, example implementation 100 comprises an aircraft that includes a visual perception augmentation system, an FMS, and an FGS. These systems and devices are described in more detail below in connection with FIG. 2 and FIG. 3.

As shown in FIG. 1A, the visual perception augmentation system is within a flight a deck of the aircraft. As further described herein, the visual perception augmentation system is configured to facilitate situational awareness of a first aircraft operator of the aircraft (e.g., a captain of the aircraft), such as when the first aircraft operator is stationed within the flight deck (e.g., to act as a first-in-command with respect to flight operations of the aircraft), and/or a second aircraft operator of the aircraft (e.g., a first officer of the aircraft), such as when the second aircraft operator is stationed within the flight deck (e.g., to act as a second-in-command with respect to flight operations of the aircraft). As further shown in FIG. 1A, the visual perception augmentation system includes a first projection display component, a second projection display component, a camera system that includes a plurality of cameras, and/or one or more processors.

In some implementations, the first projection display component is positioned within the flight deck and is configured to be within an FOV of the first aircraft operator when the first aircraft operator is stationed within the flight deck, and the second projection display component is positioned within the flight deck and is configured to be within an FOV of the second aircraft operator when the second aircraft operator is stationed within the flight deck. Each projection display component includes at least one of a head-up display (HUD), a projection screen, and/or a projection component (e.g., that is connected to, or integrated into, another component of the aircraft, such as a windscreen of the aircraft). In some implementations, the first projection display component and the second projection display component are independent components, and the first projection display component is configured to display information relevant to the first aircraft operator and the second projection display component is configured to display information relevant to the second aircraft operator.

In some implementations, the a camera system is positioned within the flight deck and is configured to observe (e.g., using the plurality of cameras of the camera system) a line of sight of the first aircraft operator, which originates from a POV of the first aircraft operator, when the first aircraft operator is stationed within the flight deck, and to observe a line of sight of the second aircraft operator, which originates from a POV of the second aircraft operator, when the second aircraft operator is stationed within the flight deck. The camera system includes eye-tracking cameras, gaze detection cameras, and/or another type of cameras that are configured to capture line-of-sight data of a person within an FOV of the camera system. The line-of-sight data indicates, for example, a POV of the person, which is a vertex of the FOV of the person. In some implementations, the POV is a position of at least one eye of the person.

In some implementations, the one or more processors are configured to control the visual perception augmentation system. For example, the one or more processors are configured to control the first projection display component, the second projection display component, and/or the camera system. The one or more processors are configured to perform one or more other operations described herein in relation to FIGS. 1A-1I.

As further shown in FIG. 1A, and by reference number 102, the camera system (e.g., using the plurality of cameras) captures first line-of-sight data and provide the first line-of-sight data to the one or more processors. The camera system captures the first line-of-sight data when the first aircraft operator is stationed within the flight deck, such as when the aircraft is flying and the first aircraft operator is monitoring and/or controlling flight operations of the aircraft. Accordingly, the first line-of-sight data indicates the POV of the first aircraft operator (e.g., a position of at least one eye of the first aircraft operator that is a vertex of the FOV of the first aircraft operator), such as when the first aircraft operator is stationed within the flight deck.

In some implementations, the one or more processors cause the camera system to capture the first line-of-sight data and provide the first line-of-sight data to the one or more processors. For example, the one or more processors send, via a communication connection between the one or more processors and the camera system, control information to the camera system, and the camera system, in response to the control information, captures the first line-of-sight data. Accordingly, the camera system sends (e.g., in real-time, or near-real time), via the communication connection, the first line-of-sight data to the one or more processors. In this way, the one or more processors obtain the first line-of-sight data.

As shown by reference number 104, the camera system (e.g., using the plurality of cameras) captures second line-of-sight data and provides the second line-of-sight data to the one or more processors. The camera system captures the second line-of-sight data when the second aircraft operator is stationed within the flight deck, such as when the aircraft is flying and the second aircraft operator is monitoring and/or controlling flight operations of the aircraft. Accordingly, the second line-of-sight data indicates the POV of the second aircraft operator (e.g., a position of at least one eye of the second aircraft operator that is a vertex of the FOV of the second aircraft operator), such as when the second aircraft operator is stationed within the flight deck).

In some implementations, the one or more processors cause camera system to capture the second line-of-sight data and provide the second line-of-sight data to the one or more processors. For example, the one or more processors send, via a communication connection between the one or more processors and the camera system, control information to the camera system, and the camera system, in response to the control information, captures the second line-of-sight data. Accordingly, the camera system sends (e.g., in real-time, or near-real time), via the communication connection, the second line-of-sight data to the one or more processors. In this way, the one or more processors obtain the second line-of-sight data.

As shown by reference number 106, the FMS (and, optionally, the FGS) provides aircraft data to the one or more processors. The aircraft data comprises navigation data, guidance data, or control data. The navigation data indicates a current dynamic state (e.g., navigational state) of the aircraft (e.g., as derived from data obtained from one or more sensors of the of the aircraft and/or navigation aids of the aircraft), as well as other static navigational information (e.g., related to terrain, airports, waypoints, and/or airways) that is obtained from one or more data structures (e.g., that are included in and/or accessible to the FMS) and/or other dynamic navigation information (e.g., related to positioning of other aircraft or other mobile objects) that is wirelessly transmitted to the aircraft. The guidance data indicates a flight path that the aircraft is to follow (e.g., as determined by the FMS, such as based on a flight plan). The control data indicates inputs (e.g., to the FMS, or other control systems of the aircraft) that are required to enable alignment of the aircraft with the flight path (e.g., as indicated by the guidance data).

In some implementations, the one or more processors cause the FMS to provide the aircraft data to the one or more processors. For example, the one or more processors send, via a communication connection between the one or more processors and the FMS, control information to the FMS, and the FMS, in response to the control information, sends (e.g., in real-time, or near-real time), via the communication connection, the aircraft data to the one or more processors. In this way, the one or more processors obtain the aircraft data.

Figure 1B:
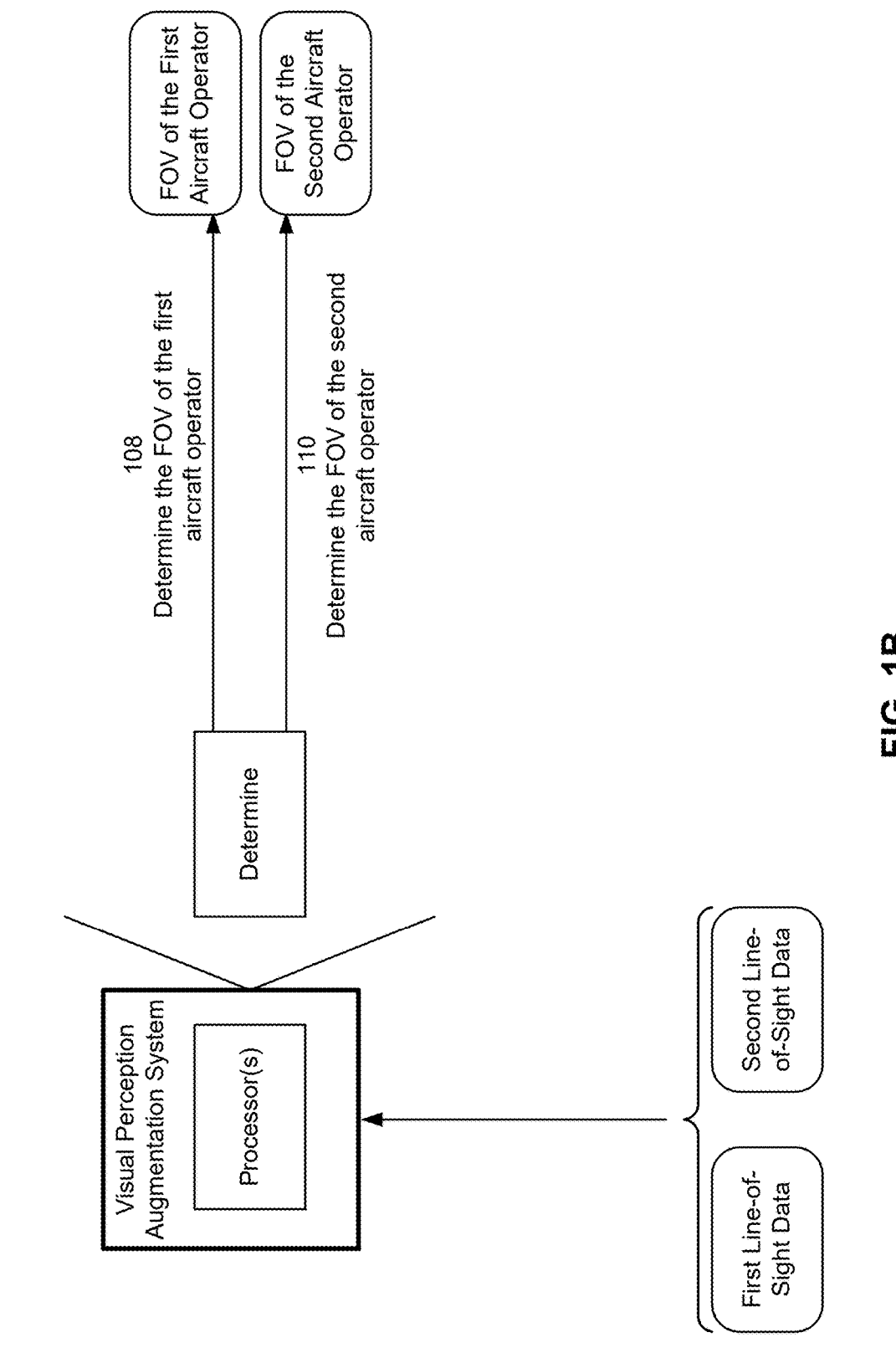

In some implementations, as shown in FIG. 1B, and by reference number 108, the visual perception augmentation system (e.g., using the one or more processors) determines an FOV of the first aircraft operator, such as based on the first line-of-sight data. For example, the visual perception augmentation system processes the first line-of-sight data (e.g. using one or more analysis techniques, such as an analysis technique that uses a Kalman filter or another time-series analysis technique) to determine an estimated position (and, optionally, an estimated position error) and/or an estimated orientation (and, optionally, an estimated orientation error) of the POV of the first aircraft operator. Accordingly, the visual perception augmentation system determines, based on the estimated position (and, optionally, the estimated position error) and/or the estimated orientation (and, optionally, the estimated orientation error) of the POV of the first aircraft operator, the FOV of the first aircraft operator. That is, the visual perception augmentation system determines the FOV of the first aircraft operator based on a representative angular range of vision of a human, a point of vision origination (e.g., as indicated by the estimated position of the POV of the first aircraft operator), and a vision direction (e.g., as indicated by the estimated orientation of the POV of the first aircraft operator).

In some implementations, as shown by reference number 110, the visual perception augmentation system (e.g., using the one or more processors) determines an FOV of the second aircraft operator, such as based on the second line-of-sight data. For example, the visual perception augmentation system processes the second line-of-sight data (e.g. using one or more analysis techniques, such as an analysis technique that uses a Kalman filter or another time-series analysis technique) to determine an estimated position (and, optionally, an estimated position error) and/or an estimated orientation (and, optionally, an estimated orientation error) of the POV of the second aircraft operator. Accordingly, the visual perception augmentation system determines, based on the estimated position (and, optionally, the estimated position error) and/or the estimated orientation (and, optionally, the estimated orientation error) of the POV of the second aircraft operator, the FOV of the second aircraft operator. That is, the visual perception augmentation system determines the FOV of the second aircraft operator based on a representative angular range of vision of a human, a point of vision origination (e.g., as indicated by the estimated position of the POV of the second aircraft operator), and a vision direction (e.g., as indicated by the estimated orientation of the POV of the second aircraft operator).

Figure 1C:
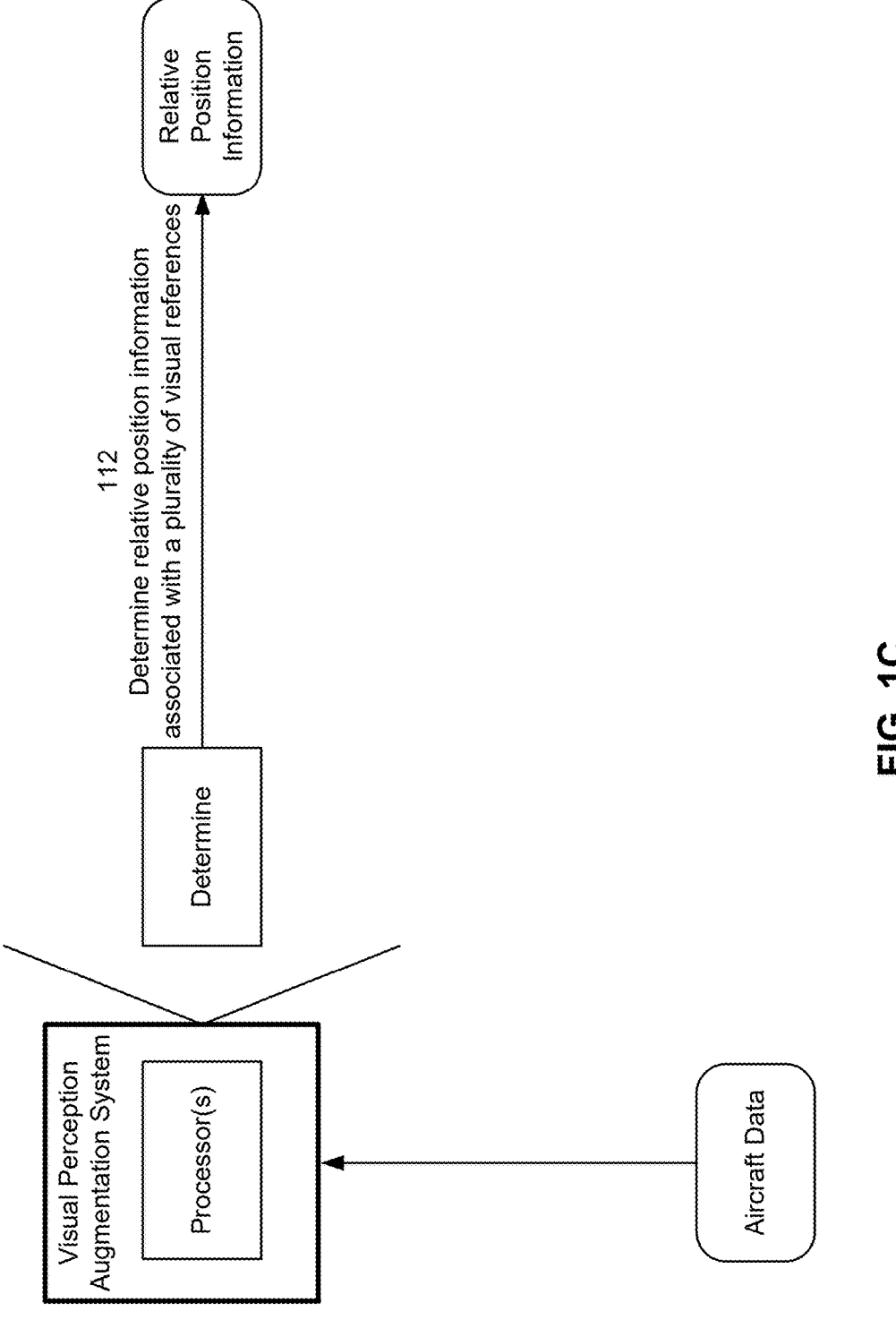

In some implementations, as shown in FIG. 1C, and by reference number 112, the visual perception augmentation system (e.g., using the one or more processors) determines relative position information associated with a plurality of visual references. The plurality of visual references include a first set of one or more visual references and/or a second set of one or more visual references, as further described herein. Each visual reference is a real-world visual reference or a virtual visual reference. A real-world visual reference corresponds to an object or feature of an environment in which the aircraft is flying, such as a horizon line, a runway, an airport, terrain, or another aircraft. A virtual visual reference does not directly correspond to a physical entity in the environment, but is associated with other information relevant to flying the aircraft, such as a flight path of the aircraft, a position of a waypoint, or other information associated with navigation, guidance, or control of the aircraft. The relative position information indicates an estimated relative position of each visual reference, of the plurality of visual references, with respect to the aircraft.

The relative position information is derived from the aircraft data (e.g., that the visual perception augmentation system obtains from the FMS, as described herein in relation to FIG. 1A and reference number 106). For example, the visual perception augmentation system determines, based on the aircraft data, an estimated position of the aircraft. The visual perception augmentation system processes the aircraft data (e.g. using one or more analysis techniques, such as an analysis technique that uses a Kalman filter or another time-series analysis technique) to determine an estimated position (and, optionally, an estimated position error) of the aircraft. Additionally, the visual perception augmentation system determines, based on the aircraft data, a position (and, optionally, a position error) of a visual reference of the plurality of visual references (e.g., as indicated by the aircraft data). Accordingly, the visual perception augmentation system determines, based on the estimated position of the aircraft and the position of the visual reference, an estimated relative position of the visual reference with respect to the aircraft.

Figure 1D:
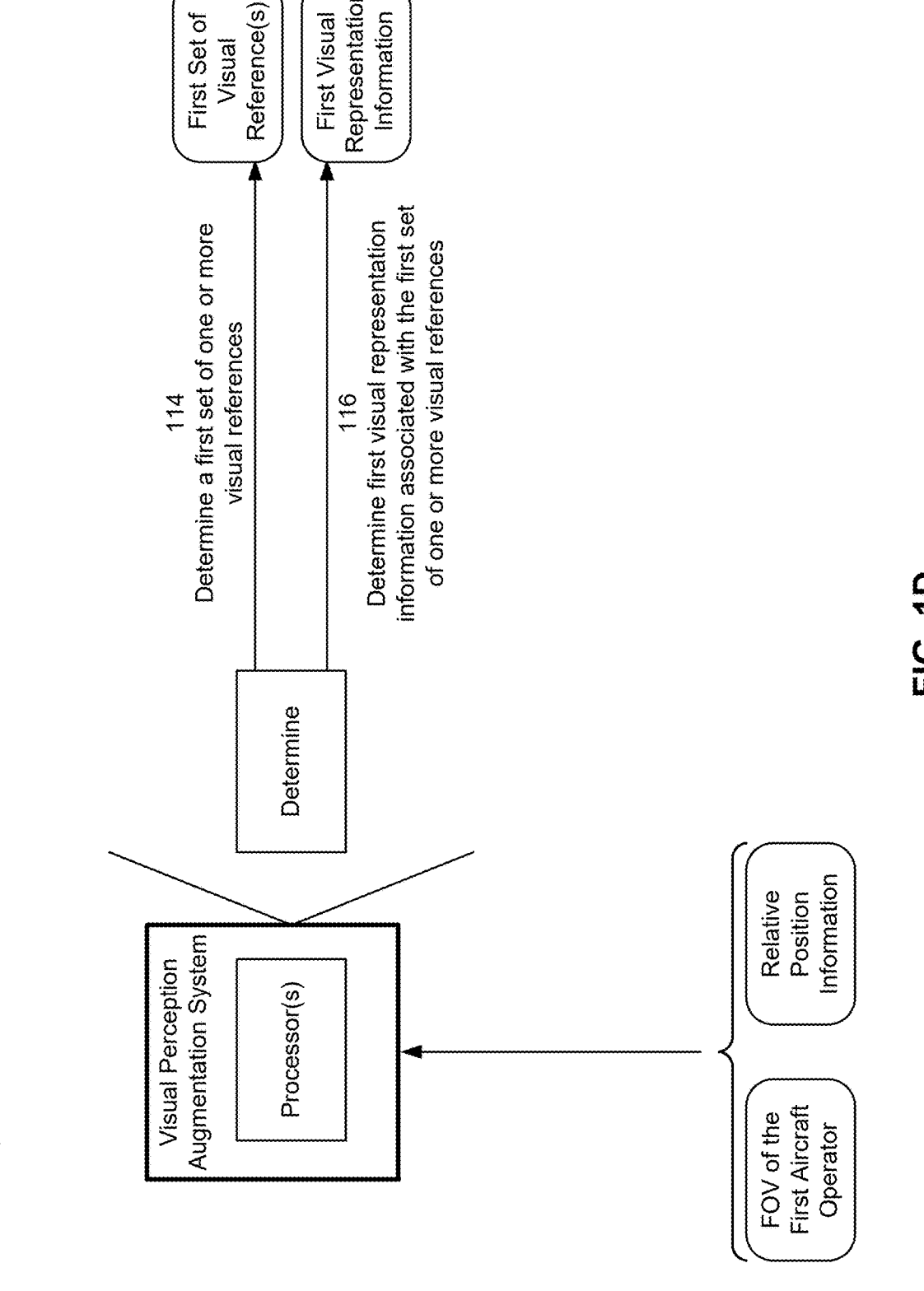

In some implementations, as shown in FIG. 1D, and by reference number 114, the visual perception augmentation system (e.g., using the one or more processors) determines a first set of one or more visual references of the plurality of visual references. For example, the visual perception augmentation system determines, based on the FOV of the first aircraft operator and the relative position information, a group of visual references of the plurality of visual references. The group of visual references includes visual references that are aligned with the FOV of the first aircraft operator (e.g., that are capable of being seen by the first aircraft operator). Additionally, the visual perception augmentation system determines (e.g., based on the aircraft data) flight operational parameters (e.g., associated with navigation, guidance, or control of the aircraft) and selects a particular set of one or more visual references, from the group of visual references, that are associated with the flight operation parameters as the first set of one or more visual references. For example, when the aircraft is in a particular flight phase (e.g., a takeoff phase, a climb phase, a cruising phase, or a landing phase, along with other examples) the visual perception augmentation system determines flight operational parameters that are relevant to the particular flight phase, and selects a particular set of one or more visual references that are associated with the flight operation parameters as the first set of one or more visual references. In this way, the first set of one or more visual references includes different visual references at different instants in time.

Additionally, or alternatively, the visual perception augmentation system identifies one or more selection parameters associated with the first projection display component. For example, the first aircraft operator interacts with an input component of the first projection display component to input the one or more selection parameters, and the first projection display component sends the one or more selection parameters to the one or more processors of the visual perception augmentation system, such as via a communication connection between the one or more processors and the first projection display component. The one or more selection parameters include, for example, a selection parameter associated with flight operational parameters (e.g., indicating a particular set of flight operation parameters that are to be displayed); a selection parameter associated with a display preference of the first aircraft operator (e.g., indicating a set of information that is to be displayed); a selection parameter associated with weather events related to the flight path of the aircraft (e.g., indicating whether weather event information is to be displayed); a selection parameter associated with positions of obstacles related to the flight path of the aircraft (e.g., indicating whether obstacle position information is to be displayed); a selection parameter associated with a performance of the aircraft (e.g., indicating whether aircraft performance information is to be displayed); a selection parameter associated with a status (e.g., an internal status and/or an external status) of the aircraft (e.g., indicating whether aircraft status information is to be displayed); a selection parameter associated with a predicted performance of the aircraft (e.g., indicating whether predicted aircraft performance information is to be displayed); a selection parameter associated with control information associated with the aircraft (e.g., indicating whether control information is to be displayed); a selection parameter associated with navigation of the aircraft (e.g., indicating whether navigation information is to be displayed); and/or a selection parameter associated with positions of other aircraft (e.g., indicating whether other aircraft position information is to be displayed). Accordingly, the visual perception augmentation system selects a particular set of one or more visual references, from the group of visual references, that are associated with the one or more selection parameters as the first set of one or more visual references.

In some implementations, the visual perception augmentation system excludes one or more visual reference from the first set of one or more visual references. For example, the visual perception augmentation system excludes a visual reference from the first set of one or more visual references when a combination error, that combines two or more of the estimated position error of the POV of the first operator, the estimated orientation error of the POV of the first operator, the estimated position error of the aircraft, and/or the position error of the visual reference, satisfies (e.g., is greater than or equal to) a combination error threshold. Alternatively, instead of excluding the visual reference, the visual perception augmentation system may mark, or otherwise indicate, that the visual reference is an "uncertain" visual reference and include the visual reference in the first set of one or more visual references.

In some implementations, as shown by reference number 116, the visual perception augmentation system (e.g., using the one or more processors) determines first visual representation information associated with the first set of one or more visual references. For example, the visual perception augmentation system determines respective characteristics of visual references in the first set of one or more visual references, such as whether each visual reference is a real-world visual reference or a virtual visual reference. Accordingly, the visual perception augmentation system generates the first visual representation information to include, based on the respective characteristics of the visual references in the first set of one or more visual references, one or more visual representation elements for each visual reference of the first set of one or more visual references. Each visual representation element is a particular shape, or a collection of shapes, with particular coloring, shading, markings, patterning, or other types of visual elements. Accordingly, one or more visual representation elements that correspond to a visual reference are configured to visually represent the visual reference (e.g., when the first visual representation information is displayed). When a visual reference is marked as an uncertain visual reference, as described herein, the one or more visual representation elements may include an indication (e.g., by using a dotted line pattern, a particular color, or other type of indication) that the visual reference is an uncertain visual reference.

Figure 1E:
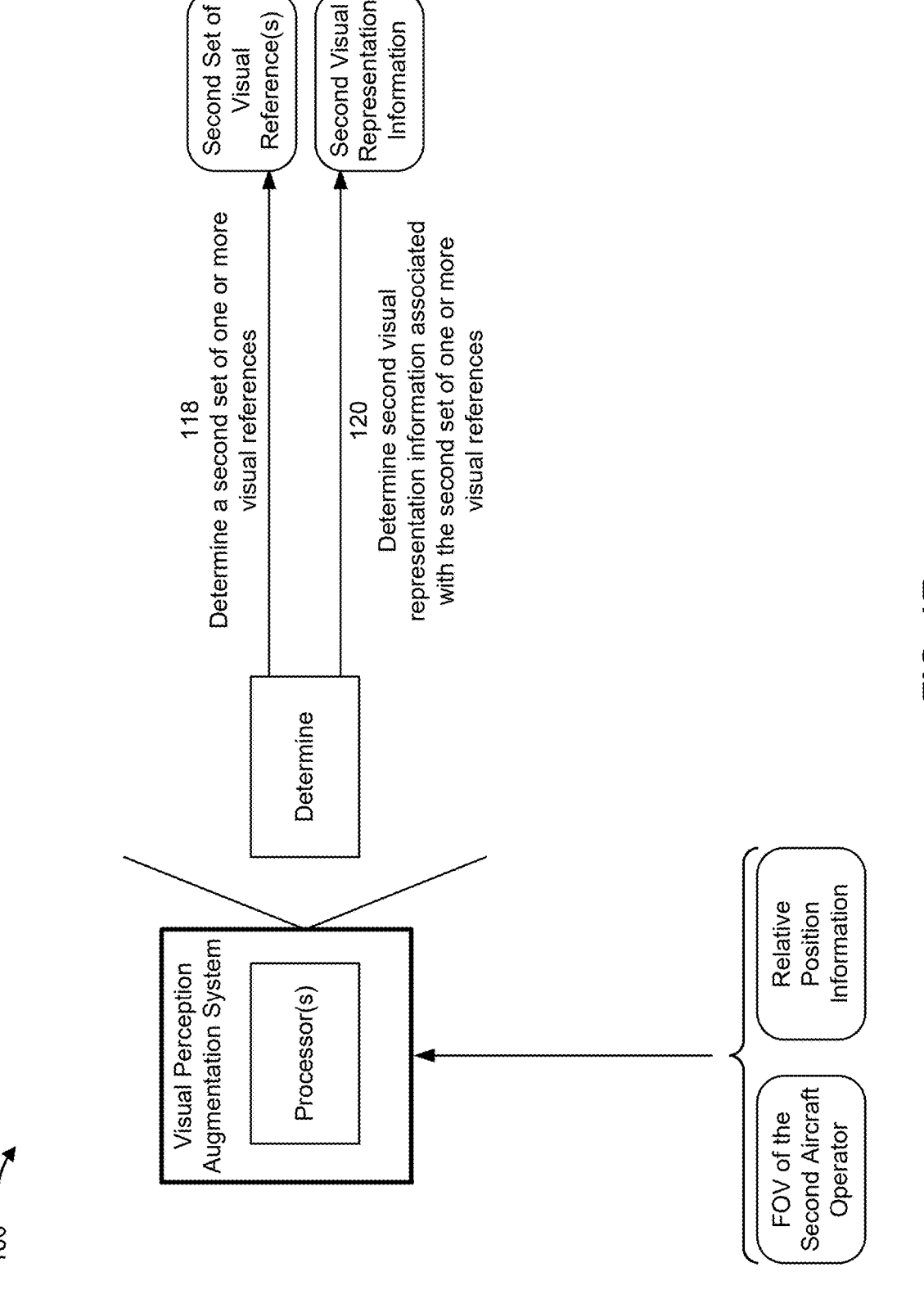

In some implementations, as shown in FIG. 1E, and by reference number 118, the visual perception augmentation system (e.g., using the one or more processors) determines a second set of one or more visual references of the plurality of visual references (e.g., that are to be displayed by the second projection display component, as further described herein). For example, the visual perception augmentation system determines, based on the FOV of the second aircraft operator and the relative position information, a group of visual references of the plurality of visual references. The group of visual references includes visual references that are aligned with the FOV of the second aircraft operator (e.g., that are capable of being seen by the second aircraft operator). Additionally, the visual perception augmentation system determines (e.g., based on the aircraft data) flight operational parameters (e.g., associated with associated with navigation, guidance, or control of the aircraft) and selects a particular set of one or more visual references, from the group of visual references, that are associated with the flight operation parameters as the second set of one or more visual references. For example, when the aircraft is in a particular flight phase (e.g., a takeoff phase, a climb phase, a cruising phase, or a landing phase, along with other examples) the visual perception augmentation system determines flight operational parameters that are relevant to the particular flight phase, and selects a particular set of one or more visual references that are associated with the flight operation parameters as the second set of one or more visual references. In this way, the second set of one or more visual references include different visual references at different instants in time.

Additionally, or alternatively, the visual perception augmentation system identifies one or more selection parameters associated with the second projection display component. For example, the second aircraft operator interacts with an input component of the second projection display component to input the one or more selection parameters, and the second projection display component sends the one or more selection parameters to the one or more processors of the visual perception augmentation system, such as via a communication connection between the one or more processors and the second projection display component. The one or more selection parameters includes the same, or similar, selection parameters described herein in relation to FIG. 1D and reference number 116. Accordingly, the visual perception augmentation system selects a particular set of one or more visual references, from the group of visual references, that are associated with the one or more selection parameters as the second set of one or more visual references.

In some implementations, the visual perception augmentation system excludes one or more visual reference from the second set of one or more visual references. For example, the visual perception augmentation system excludes a visual reference from the first set of one or more visual references when a combination error, that combines two or more of the estimated position error of the POV of the second operator, the estimated orientation error of the POV of the second operator, the estimated position error of the aircraft, and/or the position error of the visual reference, satisfies (e.g., is greater than or equal to) a combination error threshold. Alternatively, instead of excluding the visual reference, the visual perception augmentation system may mark, or otherwise indicate, that the visual reference is an uncertain visual reference and include the visual reference in the second set of one or more visual references.

In some implementations, as shown by reference number 120, the visual perception augmentation system (e.g., using the one or more processors) determines second visual representation information associated with the second set of one or more visual references. For example, the visual perception augmentation system determines respective characteristics of visual references in the second set of one or more visual references, such as whether each visual reference is a real-world visual reference or a virtual visual reference. Accordingly, the visual perception augmentation system generates the second visual representation information to include, based on the respective characteristics of the visual references in the second set of one or more visual references, one or more visual representation elements for each visual reference of the second set of one or more visual references. Each visual representation element is a particular shape, or a collection of shapes, with particular coloring, shading, markings, patterning, or other types of visual elements. Accordingly, one or more visual representation elements that correspond to a visual reference are configured to visually represent the visual reference (e.g., when the second visual representation information is displayed). When a visual reference is marked as an uncertain visual reference, as described herein, the one or more visual representation elements may include an indication (e.g., by using a dotted line pattern, a particular color, or other type of indication) that the visual reference is an uncertain visual reference.

Figure 1F:
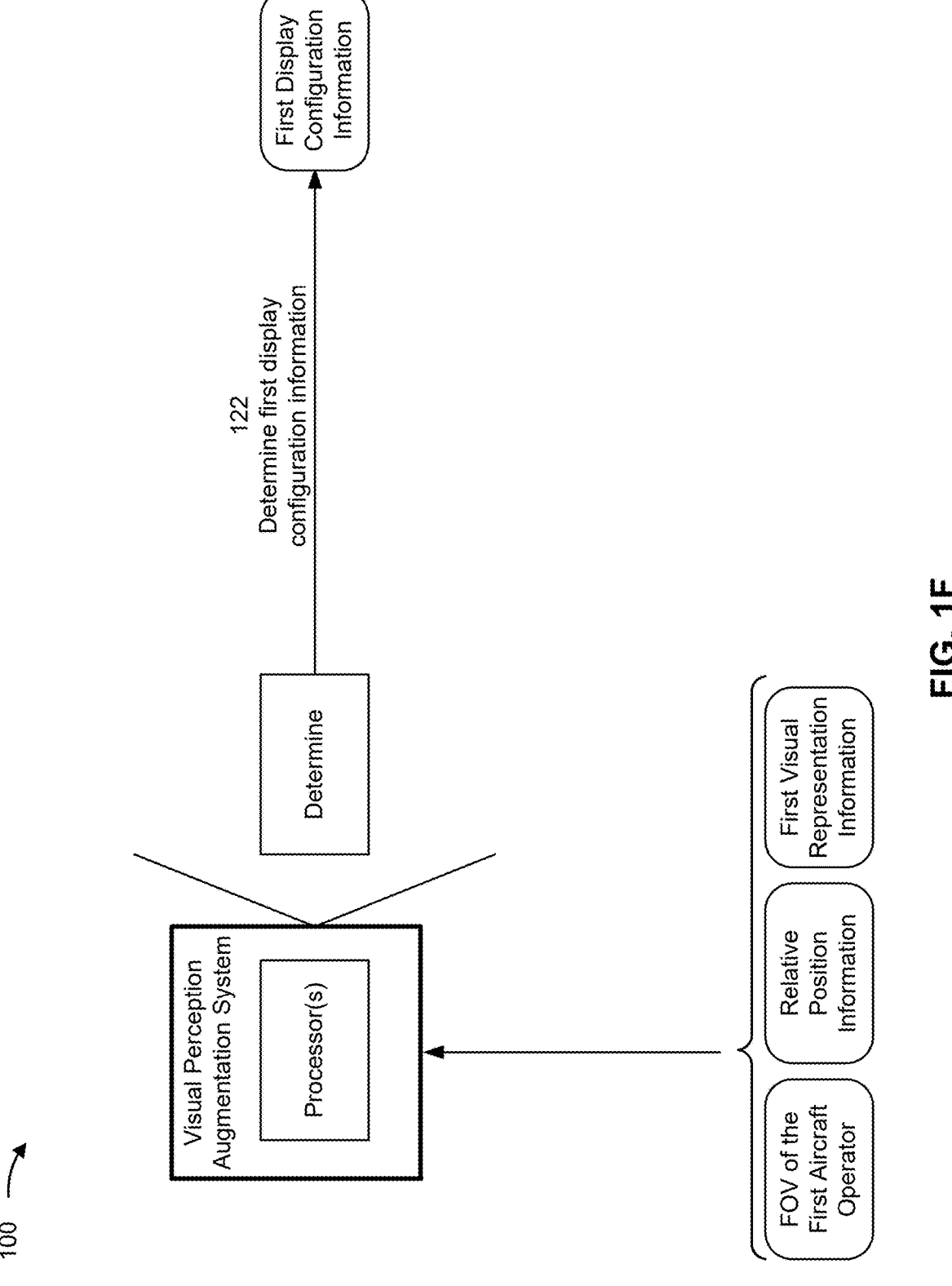

In some implementations, as shown in FIG. 1F, and by reference number 122, the visual perception augmentation system (e.g., using the one or more processors) determines first display configuration information (e.g., based on at least one of the FOV of the first aircraft operator, the relative position information, or the first visual representation information). For example, the visual perception augmentation system determines, for a visual reference, of the first set of one or more visual references, and based on the relative position information, a display scale for the visual reference. The display scale indicates how large visual representation elements that correspond to the visual reference are to appear (e.g., when the first visual representation information is displayed), which is based on a distance between the visual reference and the aircraft (e.g., as indicated by the relative position information). Additionally, or alternatively, the visual perception augmentation system determines, for the visual reference, based on the relative position information, an alignment vector associated with the first aircraft operator and the visual reference. The alignment vector indicates a line between the first aircraft operator (e.g., the POV of the first aircraft operator) and the visual reference, which is based, on a position of the visual reference and the aircraft (e.g., as indicated by the relative position information) and the FOV of the first aircraft operator. Accordingly, the visual perception augmentation system determines, based on the alignment vector, a display position for the visual reference (on the first projection display component). The display position is aligned with the alignment vector, such that the display position is along the line between the first aircraft operator and the visual reference. In this way, the display configuration information is associated with the first set of one or more visual references and the FOV of the first aircraft operator.

Figure 1G:
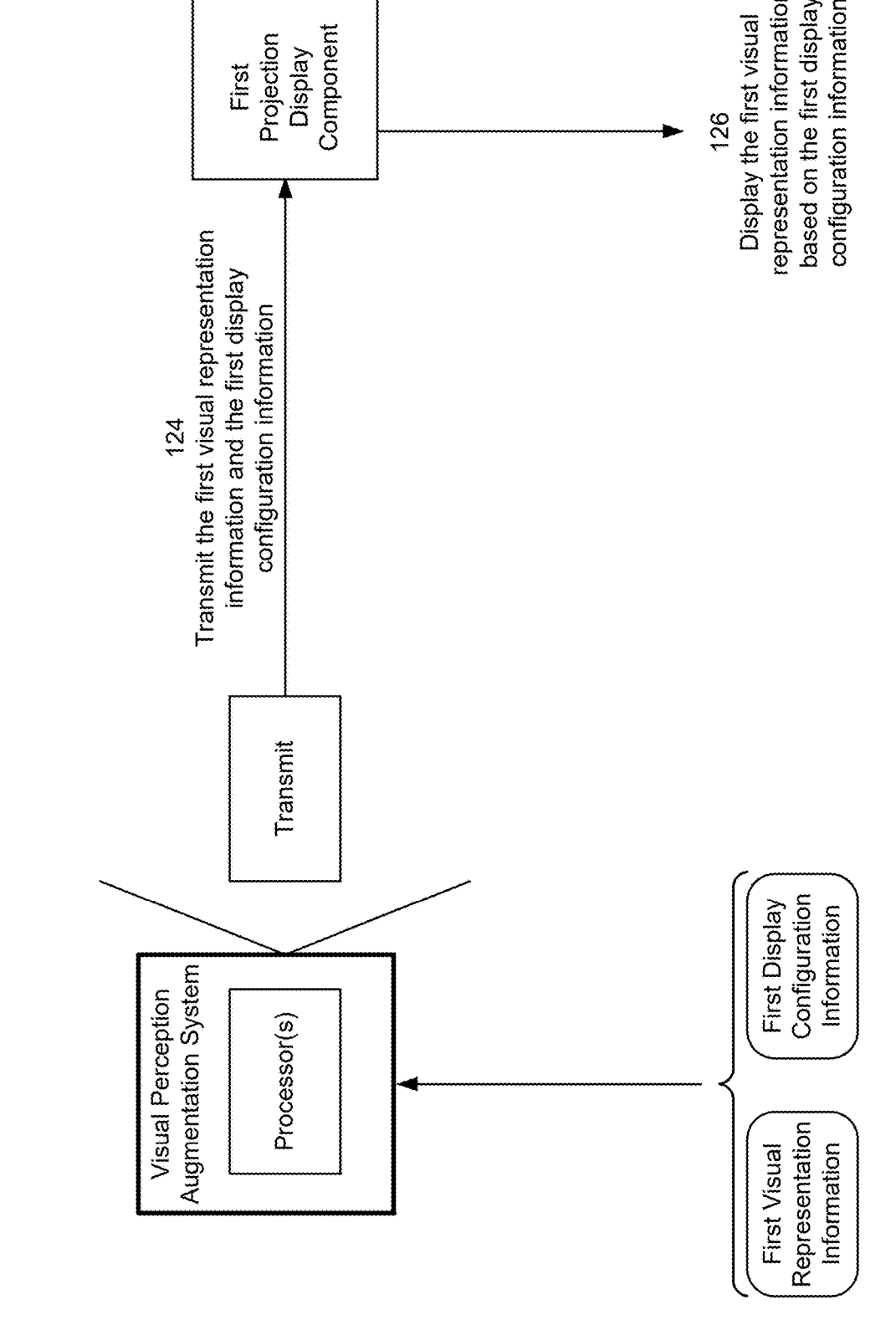

In some implementations, as shown in FIG. 1G, and by reference number 124, the visual perception augmentation system (e.g., using the one or more processors) transmits the first visual representation information and the first display configuration information. For example, the visual perception augmentation system transmits the first visual representation information and the first display configuration information to the first projection display component, such as via the communication connection between the one or more processors and the first projection display component. In some implementations, the visual perception augmentation system transmits the first visual representation information and the first display configuration information to update the first projection display component, such as to update the first projection display component to display the first visual representation information based on the first display configuration information.

Accordingly, as shown by reference number 126, the first projection display component displays the first visual representation information based on the first display configuration information. For example, the first projection display component displays, for each visual reference of the first set of one or more visual references, one or more visual representation elements that are associated with the visual reference (e.g., as indicated by the visual representation information) at a display scale and/or in display position for the visual reference (e.g., as indicated by the first display configuration information). Accordingly, the first projection display component is updated to display one or more visual representation elements that correspond to each visual reference, of the set of one or more visual references, as aligned with the POV of the first aircraft operator and a relative position of the visual reference with respect to the aircraft.

Figure 1H:
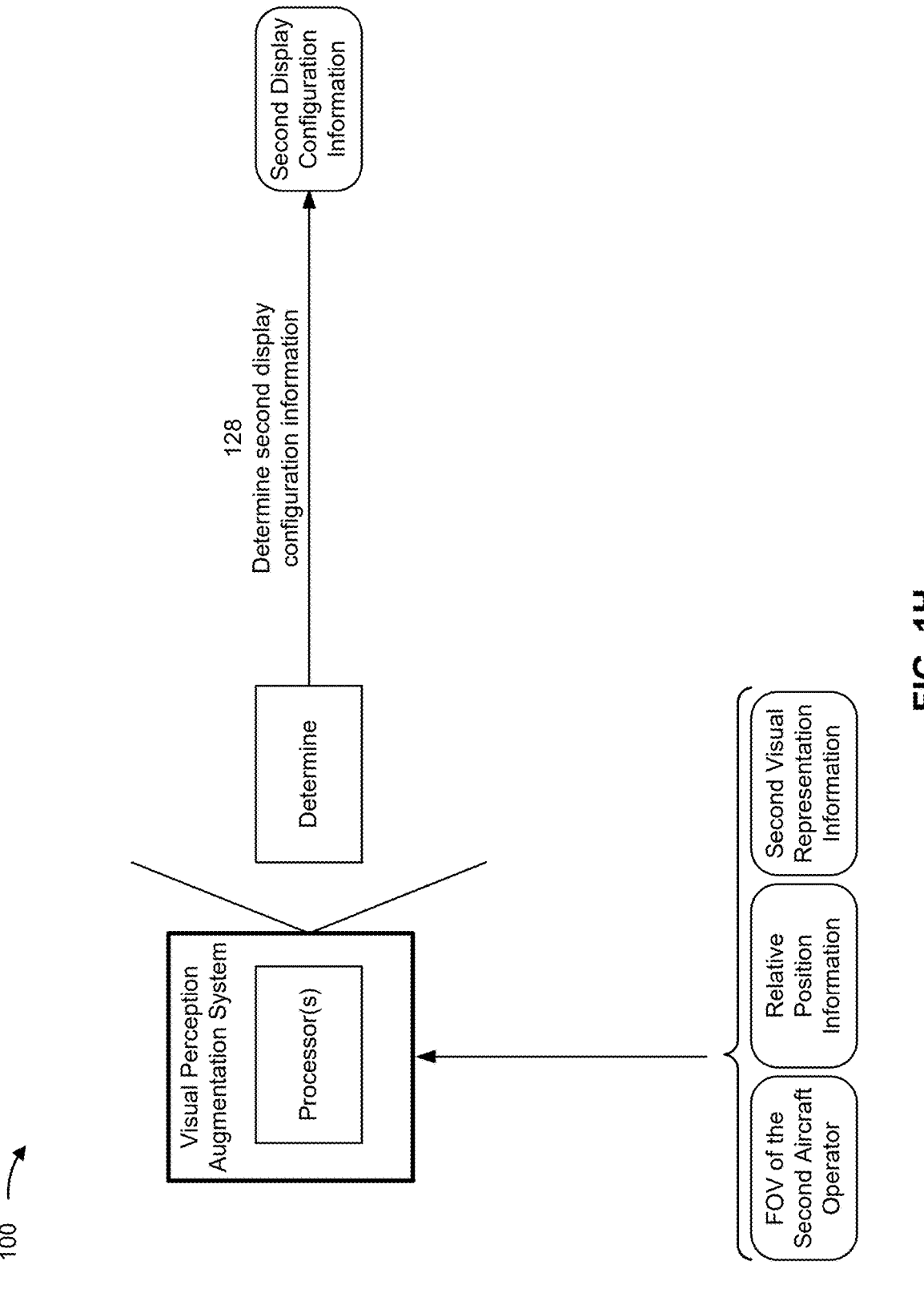

In some implementations, as shown in FIG. 1H, and by reference number 128, the visual perception augmentation system (e.g., using the one or more processors) determines second display configuration information (e.g., based on at least one of the FOV of the second aircraft operator, the relative position information, or the second visual representation information). For example, the visual perception augmentation system determines, for a visual reference, of the second set of one or more visual references, and based on the relative position information, a display scale for the visual reference. The display scale indicates how large visual representation elements that correspond to the visual reference are to appear (e.g., when the second visual representation information is displayed), which is based on a distance between the visual reference and the aircraft (e.g., as indicated by the relative position information). Additionally, or alternatively, the visual perception augmentation system determines, for the visual reference, based on the relative position information, an alignment vector associated with the second aircraft operator and the visual reference. The alignment vector indicates a line between the second aircraft operator (e.g., the POV of the second aircraft operator) and the visual reference, which is based, on a position of the visual reference and the aircraft (e.g., as indicated by the relative position information) and the FOV of the second aircraft operator. Accordingly, the visual perception augmentation system determines, based on the alignment vector, a display position for the visual reference (on the second projection display component). The display position is aligned with the alignment vector, such that the display position is along the line between the second aircraft operator and the visual reference. In this way, the display configuration information is associated with the second set of one or more visual references and the FOV of the second aircraft operator.

Figure 1I:
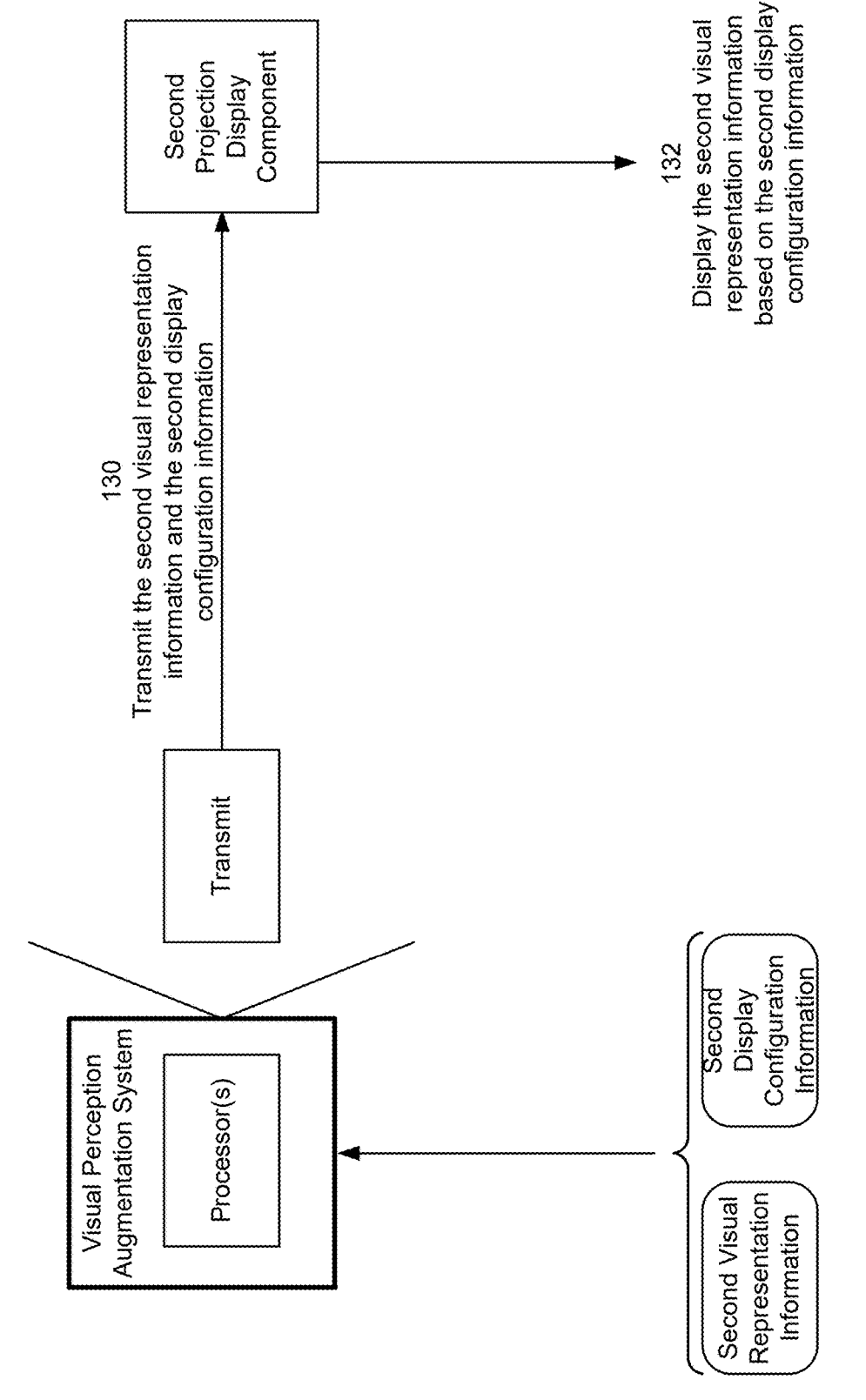

In some implementations, as shown in FIG. 1I, and by reference number 130, the visual perception augmentation system (e.g., using the one or more processors) transmits the second visual representation information and the second display configuration information. For example, the visual perception augmentation system transmits the second visual representation information and the second display configuration information to the second projection display component, such as via the communication connection between the one or more processors and the second projection display component. In some implementations, the visual perception augmentation system transmits the second visual representation information and the second display configuration information to update the second projection display component, such as to update the second projection display component to display the second visual representation information based on the second display configuration information.

Accordingly, as shown by reference number 132, the second projection display component displays the second visual representation information based on the second display configuration information. For example, the second projection display component displays, for each visual reference of the second set of one or more visual references, one or more visual representation elements that are associated with the visual reference (e.g., as indicated by the visual representation information) at a display scale and/or in a display position for the visual reference (e.g., as indicated by the second display configuration information). Accordingly, the second projection display component is updated to display one or more visual representation elements that correspond to each visual reference, of the set of one or more visual references, as aligned with the POV of the second aircraft operator and a relative position of the visual reference with respect to the aircraft.

In some implementations, the visual perception augmentation system iteratively performs at least some of the operations described herein in relation to FIGS. 1A-1I. For example, after updating the first projection display component, the visual perception augmentation system obtains updated first line-of-sight data and updated aircraft data; determines an updated FOV of the first aircraft operator; determines updated relative position information; determines an updated first set of one or more visual references; determines updated first visual representation information associated with the updated first set of one or more visual references; determines updated first display configuration information; and/or updates the first projection display component to display the updated first visual representation information based on the first display configuration information. As another example, after updating the second projection display component, the visual perception augmentation system obtains updated second line-of-sight data and updated aircraft data; determines an updated FOV of the second aircraft operator; determines updated relative position information; determines an updated second set of one or more visual references; determines updated second visual representation information associated with the updated second set of one or more visual references; determines updated second display configuration information; and/or updates the second projection display component to display the updated second visual representation information based on the second display configuration information.

As indicated above, FIGS. 1A-1I are provided as an example. Other examples may differ from what is described with regard to FIGS. 1A-1I.

Figure 2:
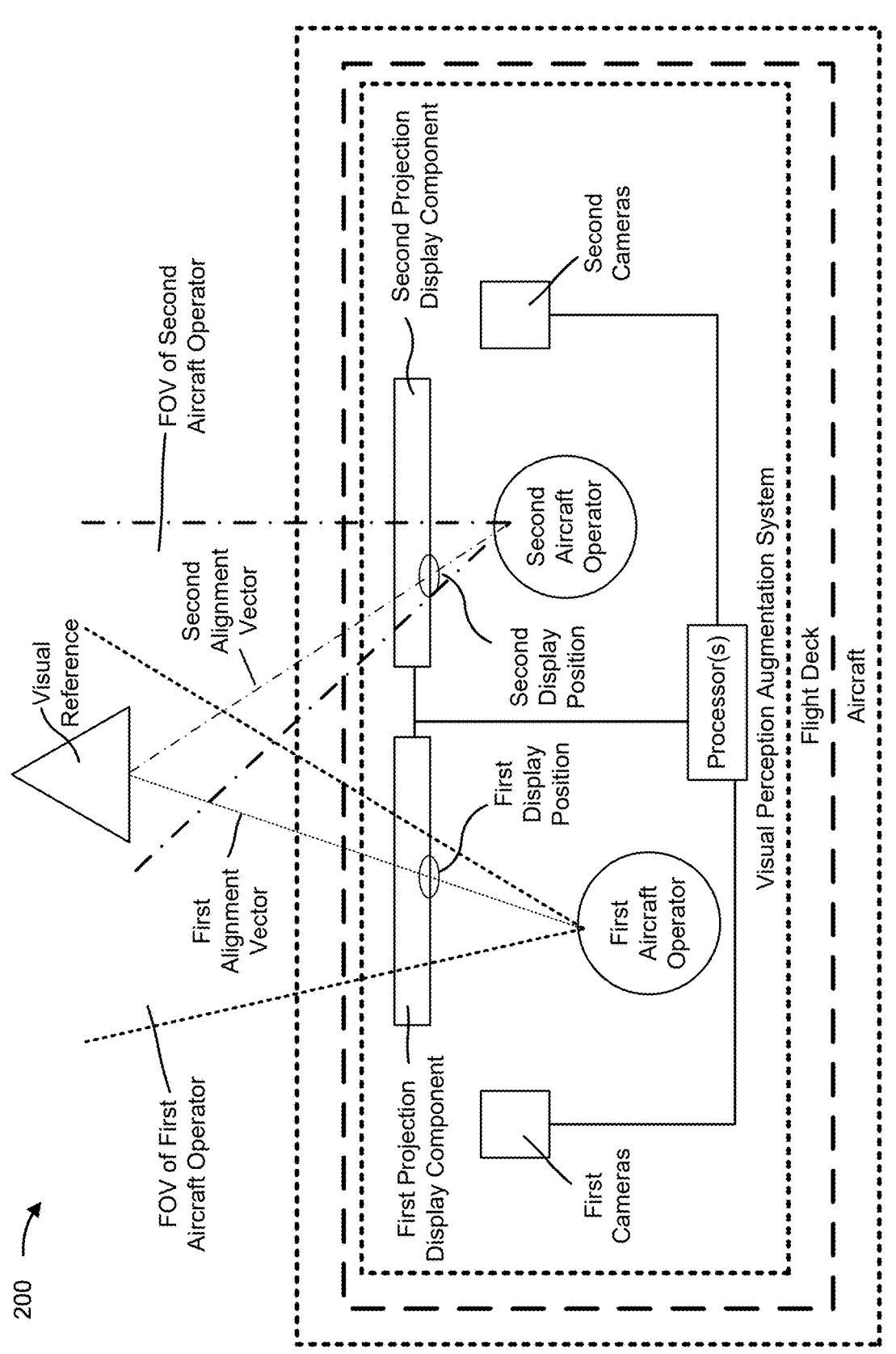
FIG. 2 is a diagram of an example implementation associated with a visual perception augmentation system.

FIG. 2 is a diagram of an example implementation 200 associated with a visual perception augmentation system. As shown in FIG. 2, the visual perception augmentation system is positioned within a flight deck of an aircraft. A first aircraft operator is stationed and a second aircraft operator are stationed within the flight deck. The visual perception augmentation system includes a first projection display component positioned within the flight deck and configured to be within the FOV of the first aircraft operator, and also includes a second projection display component positioned within the flight deck and configured to be within the FOV of the second aircraft operator. The visual perception augmentation system includes a camera system positioned within the flight deck and that includes first cameras configured to observe a line of sight of the first aircraft operator and second cameras configured to observe a line of sight of the second aircraft operator. The visual perception augmentation system includes one or more processors that are communicatively connected to the first projection display component, the second projection display component, the at least one first camera, and the at least one second camera.

As further shown in FIG. 2, a visual reference is an object or feature of an environment in which the aircraft is flying. As further shown in FIG. 2, the visual reference appears (or would appear) in different positions of the respective FOVs of the first aircraft operator and the second aircraft operator (e.g., due to different positions of the first aircraft operator and the second aircraft operator within the flight deck of the aircraft).

As described herein in relation to FIGS. 1A-1I, the one or more processors obtain first line-of-sight data captured by the first cameras of the camera system and thereby determine the FOV of the first aircraft operator; determine, based on relative position information that indicates an estimated relative position of the visual reference with respect to the aircraft, first display configuration information that is associated with the visual reference and the FOV of the first aircraft operator; and update the first projection display component to display first visual representation information associated with the visual reference based on the first display configuration information. This causes the first projection display component to display one or more visual representation elements associated with the visual reference, as indicated by the first visual representation information, to be positioned in a first display position as indicated by the first display configuration information.

Additionally, as further described herein in relation to FIGS. 1A-1I, the one or more processors obtain second line-of-sight data captured by the second cameras of the camera system and thereby determine the FOV of the second aircraft operator; determine, based on the relative position information, second display configuration information that is associated with the visual reference and the FOV of the second aircraft operator; and update the second projection display component to display second visual representation information associated with the visual reference based on the second display configuration information. This causes the second projection display component to display one or more visual representation elements associated with the visual reference, as indicated by the second visual representation information, to be positioned in a second display position as indicated by the second display configuration information.

Accordingly, as further shown in FIG. 2, the first display position is aligned with a first alignment vector between the first aircraft operator and the visual reference and the second display position is aligned with a second alignment vector between the second aircraft operator and the visual reference. In this way, visual representation elements that correspond to the visual reference respectively appear to, the first aircraft operator and the second aircraft operator, to be visually aligned.

As indicated above, FIG. 2 is provided as an example. Other examples may differ from what is described with regard to FIG. 2.

Figure 3:
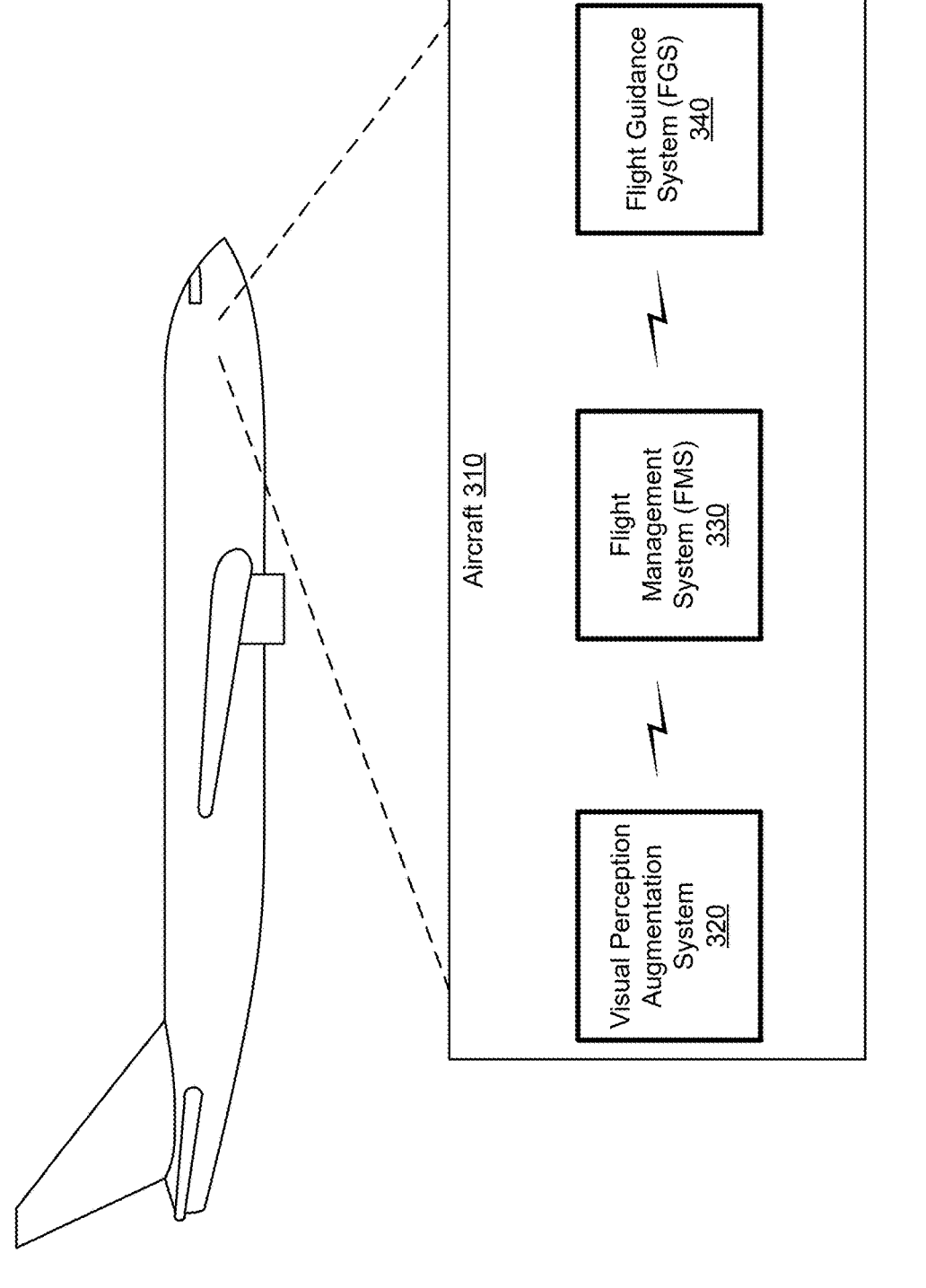
FIG. 3 is a diagram of an example environment in which systems and/or methods described herein are implemented.

FIG. 3 is a diagram of an example environment 300 in which systems and/or methods described herein are implemented. As shown in FIG. 3, environment 300 includes an aircraft 310, a visual perception augmentation system 320, an FMS 330, and/or an FGS 340. Devices of environment 300 interconnect via wired connections, wireless connections, or a combination of wired and wireless connections.

The aircraft 310 includes any suitable vehicle and/or device capable of flight. The aircraft 310 includes, for example, an airplane (e.g., a jet airplane, a propeller airplane, a glider airplane, or the like), a helicopter, a rocketship, a spaceship, a space shuttle, an airship, or a blimp, along with other examples of aerial vehicles and/or aerial devices capable of flight. The aircraft 310 includes a flight deck, in which at least one of first aircraft operator or a second aircraft operator is to be station, as described herein.

The visual perception augmentation system 320 includes one or more devices capable of receiving, generating, storing, transmitting, processing, and/or providing information, as described elsewhere herein. The visual perception augmentation system 320 comprises at least one of a first projection display component, a second projection display component, a camera system that comprises a plurality of cameras, or one or more processors, as described herein. In some implementations, the visual perception augmentation system 320 includes a computing device, such as a wireless communication device, a mobile phone, a user equipment, a laptop computer, a tablet computer, a desktop computer, a server device, or a similar type of device.

The FMS 330 includes one or more devices capable of receiving, generating, storing, transmitting, processing, and/ or providing information, as described elsewhere herein. The FMS 330 includes one or more devices, such as a flight management computer (FMC), a control display unit (CDU), and/or other devices that automate one or more of flight planning, navigation, and operational tasks of the aircraft 310. The FMS 330 is configured to generate, store, and/or update a flight plan. The FMS 330 is configured to guide or otherwise control the aircraft 310 in accordance with the flight plan.

The FGS 340 includes one or more devices capable of receiving, generating, storing, transmitting, processing, and/ or providing information, as described elsewhere herein. The FGS 340 includes one or more devices, such as a flight guidance computer (FGC), a CDU, and/or other devices that automate one or more flight guidance tasks of the aircraft 310.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
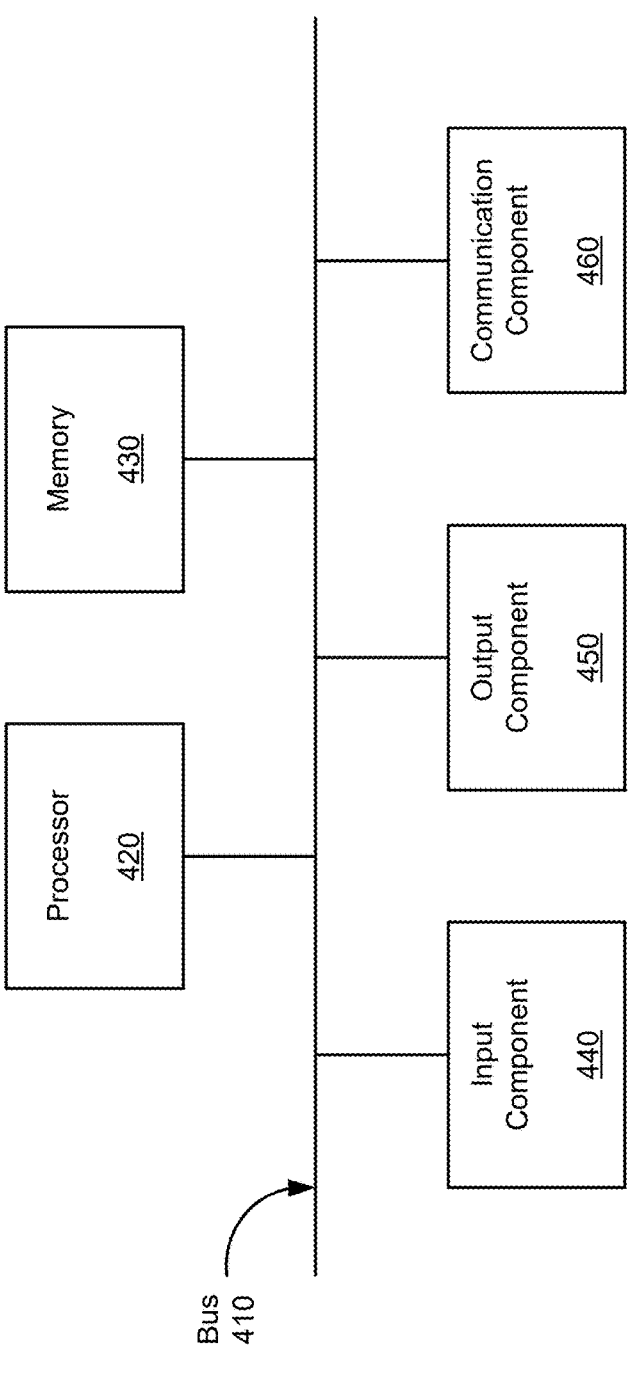
FIG. 4 is a diagram of example components of a device associated with a visual perception augmentation system.

FIG. 4 is a diagram of example components of a device 400 associated with a visual perception augmentation system. The device 400 corresponds to the aircraft 310, the visual perception augmentation system 320, the FMS 330, and/or the FGS 340. In some implementations, the aircraft 310, the visual perception augmentation system 320, the FMS 330, and/or the FGS 340 include one or more devices 400 and/or one or more components of the device 400. As shown in FIG. 4, the device 400 includes a bus 410, a processor 420, a memory 430, an input component 440, an output component 450, and/or a communication component 460.

The bus 410 includes one or more components that enable wired and/or wireless communication among the components of the device 400. The bus 410 couples together two or more components of FIG. 4, such as via operative coupling, communicative coupling, electronic coupling, and/or electric coupling. For example, the bus 410 includes an electrical connection (e.g., a wire, a trace, and/or a lead) and/or a wireless bus. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 includes random access memory (RAM), read only memory (ROM), a hard disk drive, and/or another type of memory (e.g., a flash memory, a magnetic memory, and/or an optical memory). The memory 430 includes internal memory (e.g., RAM, ROM, or a hard disk drive) and/or removable memory (e.g., removable via a universal serial bus connection). In some implementations, the memory 430 is a non-transitory computer-readable medium. The memory 430 stores information, one or more instructions, and/or software (e.g., one or more software applications) related to the operation of the device 400. In some implementations, the memory 430 includes one or more memories that are coupled (e.g., communicatively coupled) to one or more processors (e.g., processor 420), such as via the bus 410. Communicative coupling between a processor 420 and a memory 430 enables the processor 420 to read and/or process information stored in the memory 430 and/or to store information in the memory 430.

The input component 440 enables the device 400 to receive input, such as user input and/or sensed input. For example, the input component 440 includes a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 includes a receiver, a transmitter, a transceiver, a modem, a network interface card, and/or an antenna.

The device 400 performs one or more operations or processes described herein. For example, a non-transitory computer-readable medium (e.g., memory 430) stores a set of instructions (e.g., one or more instructions or code) for execution by the processor 420. The processor 420 executes the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, the processor 420 is configured to perform one or more operations or processes described herein. Thus, implementations described herein are not limited to any specific combination of hardware circuitry and software.

The number and arrangement of components shown in FIG. 4 are provided as an example. The device 400 includes additional components, fewer components, different components, or differently arranged components than those shown in FIG. 4. Additionally, or alternatively, a set of components (e.g., one or more components) of the device 400 performs one or more functions described as being performed by another set of components of the device 400.

FIG. 5 is a flowchart of an example process 500 associated with a visual perception augmentation system. In some implementations, one or more process blocks of FIG. 5 are performed by a system (e.g., the visual perception augmentation system 320) within a flight deck of aircraft (the aircraft 310). In some implementations, one or more process blocks of FIG. 5 are performed by another device or a group of devices separate from or including the system, such as another system (e.g., the FMS 330 and/or the FGS 340) of the aircraft. Additionally, or alternatively, one or more process blocks of FIG. 5 are performed by one or more components of device 400, such as processor 420, memory 430, input component 440, output component 450, and/or communication component 460.

The system also includes a first projection display component positioned within the flight deck and configured to be within an FOV of a first aircraft operator when stationed within the flight deck, a second projection display component positioned within the flight deck and configured to be with an FOV of a second aircraft operator when stationed within the flight deck, a camera system configured to observe a line of sight of the first aircraft operator and a line of sight of the second aircraft operator.

As shown in FIG. 5, process 500 includes determining, based on first line-of-sight data captured by the camera system, the FOV of the first aircraft operator (block 510). For example, the system determines, based on first line-of-sight data captured by the camera system, the FOV of the first aircraft operator, as described above.

As further shown in FIG. 5, process 500 includes determining, based on second line-of-sight data captured by the camera system, the FOV of the second aircraft operator (block 520). For example, the system determines, based on second line-of-sight data captured by the camera system, the FOV of the second aircraft operator, as described above.

As further shown in FIG. 5, process 500 includes determining first display configuration information based on a first set of one or more visual references derived from the FOV of the first aircraft operator (block 530). For example, the system determines, based on relative position information that is derived from aircraft data, first display configuration information based on a first set of one or more visual references derived from the FOV of the first aircraft operator, as described above.

As further shown in FIG. 5, process 500 include determining second display configuration information based on a second set of one or more visual references derived from the FOV of the second aircraft operator (block 540). For example, the system determines, based on the relative position information, second display configuration information based on a second set of one or more visual references derived from the FOV of the second aircraft operator, as described above.

As further shown in FIG. 5, process 500 includes updating the first projection display component to display at least first visual representation information associated with the first set of one or more visual references based on the first display configuration information (block 550). For example, the system updates the first projection display component to display at least first visual representation information associated with the first set of one or more visual references based on the first display configuration information, as described above.

As further shown in FIG. 5, process 500 includes updating the second projection display component to display at least second visual representation information associated with the second set of one or more visual references based on the second display configuration information (block 560). For example, the system updates the second projection display component to display at least second visual representation information associated with the second set of one or more visual references based on the second display configuration information, as described above.

Process 500 includes additional implementations, such as any single implementation or any combination of implementations described below and/or in connection with one or more other processes described elsewhere herein.

In a first implementation, process 500 includes deriving the FOV of the first aircraft operator based on a POV of the first aircraft operator.

In a second implementation, alone or in combination with the first implementation, the aircraft data comprises navigation data, guidance data, or controlling data.

In a third implementation, alone or in combination with one or more of the first and second implementations, the relative position information indicates an estimated relative position of each visual reference, of the first set of one or more visual references and the second set of one or more visual references, with respect to the aircraft.

In a fourth implementation, alone or in combination with one or more of the first through third implementations, process 500 includes determining an estimated position of the aircraft and a position of a visual reference of the first set of one or more visual references and the second set of one or more visual references, and determining, based on the estimated position of the aircraft and the position of the visual reference, the relative position information to indicate to indicate an estimated relative position of the visual reference with respect to the aircraft.

In a fifth implementation, alone or in combination with one or more of the first through fourth implementations, process 500 includes determining, based on the first FOV of the first aircraft operator and the relative position information, a group of visual references, determining, based on the aircraft data, flight operational parameters, and selecting the first set of one or more visual references from the group of visual references that are associated with the flight operational parameters.

In a sixth implementation, alone or in combination with one or more of the first through fifth implementations, process 500 includes determining, based on the FOV of the first aircraft operator and the relative position information, a group of visual references, identifying selection parameters associated with the first projection display component, and selecting the first set of one or more visual references from the group of visual references that are associated with the selection parameters.

In a seventh implementation, alone or in combination with one or more of the first through sixth implementations, the selection parameters comprise a selection parameter associated with flight operational parameters, a selection parameter associated with a display preference of the first aircraft operator, a selection parameter associated with weather events related to a flight path of the aircraft, a selection parameter associated with positions of obstacles related to the flight path of the aircraft, a selection parameter associated with a performance of the aircraft, a selection parameter associated with a status of the aircraft, a selection parameter associated with a predicted performance of the aircraft, a selection parameter associated with control information associated with the aircraft, a selection parameter associated with navigation of the aircraft, or a selection parameter associated with positions of other aircraft.

In an eighth implementation, alone or in combination with one or more of the first through seventh implementations, process 500 includes determining respective characteristics of visual references in the first set of one or more visual references, and generating the first visual representation information, based on the respective characteristics of the visual references in the first set of one or more visual references, that comprises one or more visual representation elements for each visual reference of the first set of one or more visual references.

In a ninth implementation, alone or in combination with one or more of the first through eighth implementations, process 500 includes determining, based on the relative position information, a display scale for a visual reference of the first set of one or more visual references, determining, based on the relative position information, an alignment vector associated with a POV of the first aircraft operator and the visual reference, and determining, based on the alignment vector, a display position for the visual reference.

In a tenth implementation, alone or in combination with one or more of the first through ninth implementations, wherein the first visual representation information indicates, for each visual reference of the first set of one or more visual references, one or more visual representation elements, wherein the first display configuration information indicates, for each visual reference of the first set of one or more visual references, a display scale and a display position, and wherein the one or more processors, to update the first projection display component to display at least the first visual representation information based on the first display configuration information, are configured to transmitting the first visual representation information and the first display configuration information to the first projection display component to update the first projection display component to display, for each visual reference of the first set of one or more visual references, the one or more visual representation elements at the display scale and in the display position.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations described herein to the precise forms that are described. Modifications and variations may be made in light of the above description or may be acquired from practice of the implementations described herein.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations described herein. Thus, the operation and behavior of the systems and/or methods are described herein without reference to specific software code-it being understood that software and hardware can be designed to implement the systems and/or methods based on the description herein.

Even though particular combinations of features are recited in the claims and/or described in the specification, these combinations are not intended to limit the implementations described herein. In fact, many of these features may be combined in ways not specifically recited in the claims and/or described in the specification. Although each dependent claim listed below may directly depend on only one claim, the description includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a component" or "one or more components" (or another element, such as "a processor" or "one or more processors") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items,), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A visual perception augmentation system, within a flight deck of an aircraft, comprising:
   a first projection display component configured to be within a field of view (FOV) of a first aircraft operator;
   a second projection display component configured to be within a FOV of a second aircraft operator;
   a camera system configured to observe a line of sight of the first aircraft operator and a line of sight of the second aircraft operator; and
   one or more processors configured to:
   determine, based on relative position information derived from aircraft data, a first alignment vector associated with a first point of view (POV) of the first aircraft operator and a visual reference;
   determine, based on the first alignment vector, first display configuration information based on a first set of one or more visual references derived from the FOV of the first aircraft operator;
   determine, based on the relative position information, a second alignment vector associated with a second point of view (POV) of the second aircraft operator and the visual reference;
   determine, based on the second alignment vector, second display configuration information based on a second set of one or more visual references derived from the FOV of the second aircraft operator;
   update the first projection display component to display at least first visual representation information associated with the first set of one or more visual references based on the first display configuration information; and
   update the second projection display component to display at least second visual representation information associated with the second set of one or more visual references based on the second display configuration information.

2. The visual perception augmentation system of claim 1, wherein the one or more processors are further configured to:
   derive the FOV of the first aircraft operator based on a point of view (POV) of the first aircraft operator.

3. The visual perception augmentation system of claim 1, wherein the aircraft data comprises:
   navigation data;
   guidance data; or
   control data.

4. The visual perception augmentation system of claim 1, wherein the relative position information indicates an estimated relative position of each visual reference, of the first set of one or more visual references and the second set of one or more visual references, with respect to the aircraft.

5. The visual perception augmentation system of claim 1, wherein the one or more processors are further configured to:
   determine an estimated position of the aircraft and a position of a visual reference of the first set of one or more visual references and the second set of one or more visual references; and
   determine, based on the estimated position of the aircraft and the position of the visual reference, the relative position information to indicate an estimated relative position of the visual reference with respect to the aircraft.

6. The visual perception augmentation system of claim 1, wherein the one or more processors are further configured to:
   determine, based on the FOV of the first aircraft operator and the relative position information, a group of visual references;
   determine, based on the aircraft data, flight operational parameters; and
   select the first set of one or more visual references from the group of visual references that are associated with the flight operational parameters.

7. The visual perception augmentation system of claim 1, wherein the one or more processors are further configured to:
   determine, based on the FOV of the first aircraft operator and the relative position information, a group of visual references;
   identify selection parameters associated with the first projection display component; and
   select the first set of one or more visual references from the group of visual references that are associated with selection parameters.

8. The visual perception augmentation system of claim 7, wherein the selection parameters comprise:
   a selection parameter associated with flight operational parameters;
   a selection parameter associated with a display preference of the first aircraft operator;
   a selection parameter associated with weather events related to a flight path of the aircraft;
   a selection parameter associated with positions of obstacles related to the flight path of the aircraft;
   a selection parameter associated with a performance of the aircraft;
   a selection parameter associated with a status of the aircraft;
   a selection parameter associated with a predicted performance of the aircraft;
   a selection parameter associated with control information associated with the aircraft;
   a selection parameter associated with navigation of the aircraft; or
   a selection parameter associated with positions of other aircraft.

9. The visual perception augmentation system of claim 1, wherein the one or more processors are further configured to:
   determine respective characteristics of visual references in the first set of one or more visual references; and
   generate the first visual representation information, based on the respective characteristics of the visual references in the first set of one or more visual references, that comprises one or more visual representation elements for each visual reference of the first set of one or more visual references.

10. The visual perception augmentation system of claim 1, wherein the one or more processors, to determine the first display configuration information, are configured to:
   determine, based on the relative position information, a display scale for a visual reference of the first set of one or more visual references;

determine, based on the relative position information, an alignment vector associated with a point of view (POV) of the first aircraft operator and the visual reference; and determine, based on the alignment vector, a display position for the visual reference.

11. The visual perception augmentation system of claim 1, wherein the first visual representation information indicates, for each visual reference of the first set of one or more visual references, one or more visual representation elements, wherein the first display configuration information indicates, for each visual reference of the first set of one or more visual references, a display scale, and a display position, and wherein the one or more processors, to update the first projection display component to display at least the first visual representation information based on the first display configuration information, are configured to:

transmit the first visual representation information and the first display configuration information to the first projection display component to update the first projection display component to display, for each visual reference of the first set of one or more visual references, the one or more visual representation elements at the display scale and in the display position.

12. A non-transitory computer-readable medium storing a set of instructions, the set of instructions comprising:

one or more instructions that, when executed by one or more processors of a system within a flight deck of an aircraft, cause the system to:

determine, based on line-of-sight data associated with an aircraft operator, a field of view (FOV) of the aircraft operator;

determine, based on relative position information, an alignment vector associated with a point of view (POV) of the aircraft operator and a visual reference;

determine, based on the alignment vector, display configuration information based on a set of one or more visual references derived from the FOV of the aircraft operator; and update a projection display component that is positioned within the flight deck and within the FOV of the aircraft operator to display at least visual representation information associated with the set of one or more visual references based on the display configuration information.

13. The non-transitory computer-readable medium of claim 12, wherein the one or more instructions further cause the system to:

select the set of one or more visual references, from a plurality of visual references, that are associated with selection parameters.

14. The non-transitory computer-readable medium of claim 13, wherein the selection parameters comprise:

a selection parameter associated with flight operational parameters;

a selection parameter associated with a display preference of the aircraft operator;

a selection parameter associated with weather events related to a flight path of the aircraft;

a selection parameter associated with positions of obstacles related to the flight path of the aircraft;

a selection parameter associated with a performance of the aircraft;

a selection parameter associated with a status of the aircraft;

a selection parameter associated with a predicted performance of the aircraft;

a selection parameter associated with control information associated with the aircraft;

a selection parameter associated with navigation of the aircraft; or a selection parameter associated with positions of other aircraft.

15. The non-transitory computer-readable medium of claim 12, wherein the one or more instructions, that cause the system to determine the display configuration information, cause the system to:

determine, based on the alignment vector, a display position for the visual reference.

16. The non-transitory computer-readable medium of claim 12, wherein the one or more instructions, that cause the system to update the projection display component to display at least the visual representation information is based on the display configuration information, cause the system to:

transmit the visual representation information and the display configuration information to the projection display component to update the projection display component to display one or more visual representation elements that are associated with a visual reference, of the set of one or more visual references, as indicated by the visual representation information, in a display position for the visual reference that is indicated by the display configuration information.

17. A method performed by a system within a flight deck of an aircraft, comprising:

determining, based on line-of-sight data associated with an aircraft operator, a field of view (FOV) of the aircraft operator;

determining an alignment vector associated with a point of view (POV) of the aircraft operator and a visual reference;

determining, based on the alignment vector, display configuration information based on a set of one or more visual references and derived from the FOV of the aircraft operator; and updating a projection display component that is positioned within the flight deck and within the FOV of the aircraft operator to display at least visual representation information associated with the set of one or more visual references based on the display configuration information.

18. The method of claim 17, wherein determining the display configuration information comprises:

determining the display configuration information further based on an estimated relative position of a visual reference with respect to the aircraft; and determining, based on the alignment vector, a display position for the visual reference.

19. The method of claim 17, wherein updating the projection display component to display at least the visual representation information based on the display configuration information comprises:

updating the projection display component to display one or more visual representation elements associated with a visual reference, of the set of one or more visual references, as indicated by the visual representation information, and positioned as indicated by the display configuration information.

20. The method of claim 17, further comprising:

determining, based on updated line-of-sight data associated with the aircraft operator, an updated FOV of the aircraft operator;

determining updated display configuration information based on the set of one or more visual references and derived from the updated FOV of the aircraft operator; and updating the projection display component to display at least updated visual representation information associated with the set of one or more visual references based on the updated display configuration information.

\* \* \* \* \*